United States Patent
Brightling et al.

(10) Patent No.: US 9,623,391 B2
(45) Date of Patent: Apr. 18, 2017

(54) MONITORING DEVICE INSTALLATION METHOD AND APPARATUS

(71) Applicant: Johnson Matthey PLC, London (GB)

(72) Inventors: John Robert Brightling, Stockton-on-Tees (GB); Jumal Ahmad Shah, Middlesbrough (GB)

(73) Assignee: JOHNSON MATTHEY PLC, London (GB)

( * ) Notice: Subject to any disclaimer, the term of this patent is extended or adjusted under 35 U.S.C. 154(b) by 78 days.

(21) Appl. No.: 14/643,428

(22) Filed: Mar. 10, 2015

(65) Prior Publication Data

US 2016/0263542 A1     Sep. 15, 2016

Related U.S. Application Data

(63) Continuation of application No. 13/387,226, filed as application No. PCT/GB2010/051119 on Jul. 7, 2010, now Pat. No. 9,056,295.

(30) Foreign Application Priority Data

Jul. 28, 2009    (GB) .................................. 0913093.1

(51) Int. Cl.
*B01J 8/00* (2006.01)
*B01J 8/06* (2006.01)

(52) U.S. Cl.
CPC ................ *B01J 8/003* (2013.01); *B01J 8/06* (2013.01); *B01J 2208/0007* (2013.01);
(Continued)

(58) Field of Classification Search
CPC .... B01J 2208/00752; B01J 2208/00769; B01J 8/003
(Continued)

(56) References Cited

U.S. PATENT DOCUMENTS 1,185,459 A * 5/1916 Worley ................... F16L 11/18
                                                                138/120
2,997,150 A * 8/1961 Emanuelson ........ B65G 11/146
                                                                193/16
(Continued)

FOREIGN PATENT DOCUMENTS

EP    0 548 999 A1    6/1993
EP    1 749 568 A1    2/2007
(Continued)

OTHER PUBLICATIONS

European Office Action for Application No. 10 738 025.5 dated Feb. 4, 2014.
(Continued)

*Primary Examiner* — Timothy L Maust
(74) *Attorney, Agent, or Firm* — RatnerPrestia

(57) ABSTRACT

A method for installing a monitoring device with the simultaneous loading of a particulate catalyst into a vertical catalyst tube includes (i) introducing a monitoring device into the tube, (ii) introducing monitoring device alignment apparatus into the tube, (iii) introducing catalyst loading apparatus into the tube, (iv) loading catalyst particles into the top of the tube whereinafter they contact said catalyst loading apparatus as they pass down the tube, forming a uniform bed of catalyst beneath said catalyst loading apparatus and alignment apparatus and around said monitoring device, and (v) simultaneously removing the catalyst loading apparatus and alignment apparatus from the catalyst tube in timed relationship to the catalyst loading. The monitoring device alignment apparatus includes a ring member and two or more spacing members affixed to the ring member such that the ring member and the monitoring device are centrally positioned within the tube.

13 Claims, 2 Drawing Sheets

(52) U.S. Cl.
CPC ............... *B01J 2208/00061* (2013.01); *B01J 2208/00088* (2013.01); *B01J 2208/00752* (2013.01); *B01J 2208/00778* (2013.01)

(58) Field of Classification Search
USPC .... 141/1, 256, 259, 286; 414/160, 804, 808; 422/213, 216
See application file for complete search history.

(56) References Cited

U.S. PATENT DOCUMENTS

| | | | | |
|---|---|---|---|---|
| 3,949,850 | A | * | 4/1976 | Schumm ............ B65G 11/083 193/16 |
| 4,225,033 | A | * | 9/1980 | Fukagai ............ B65G 69/186 141/93 |
| 4,750,602 | A | * | 6/1988 | Souda ............... A01D 46/20 193/25 C |
| 5,154,271 | A | * | 10/1992 | Binzen ............. B65G 11/146 193/25 C |
| 5,247,970 | A | | 9/1993 | Ryntveit et al. |
| 5,687,780 | A | * | 11/1997 | Minami ............ B01J 8/002 141/1 |
| 5,753,585 | A | * | 5/1998 | Minami ............ B01J 8/003 422/105 |
| 6,182,716 | B1 | | 2/2001 | Fry |
| 6,244,477 | B1 | * | 6/2001 | Hudelmaier ......... B65G 53/54 193/2 R |
| 6,467,513 | B1 | | 10/2002 | Yanaru et al. |
| 7,712,490 | B2 | | 5/2010 | Brennom |
| 8,025,472 | B2 | | 9/2011 | Fry |
| 8,287,227 | B2 | | 10/2012 | Fry |
| 9,255,659 | B2 | * | 2/2016 | Cottard ............... B01J 8/002 |
| 2007/0116090 | A1 | | 5/2007 | Park et al. |
| 2014/0034184 | A1 | * | 2/2014 | Richter ............... B01J 8/002 141/1 |

FOREIGN PATENT DOCUMENTS

| | | |
|---|---|---|
| EP | 1 752 210 A1 | 2/2007 |
| EP | 2 191 889 A1 | 6/2010 |
| WO | WO-2007/039764 A1 | 4/2007 |
| WO | WO-2007/109442 A2 | 9/2007 |

OTHER PUBLICATIONS

International Search Report dated Sep. 28, 2010, from PCT International Application No. PCT/GB2010/051119.

* cited by examiner

MONITORING DEVICE INSTALLATION METHOD AND APPARATUS

CROSS-REFERENCE TO RELATED APPLICATIONS

This application is continuation of U.S. application Ser. No. 13/387,226, filed Jan. 26, 2012 which is a U.S. National Phase application of PCT International Application No. PCT/GB2010/051119, filed Jul. 7, 2010, and claims priority of British Patent Application No. 0913093.1, filed Jul. 28, 2009, the disclosures of which are incorporated herein by reference in their entireties for all purposes.

FIELD OF THE INVENTION

This invention relates to a method and apparatus for the installation of a monitoring device in a particulate-filled tube, in particular the installation of a temperature-measuring device in a vertical tube with simultaneous loading of catalyst.

BACKGROUND OF THE INVENTION

Catalyst-filled tubes are widely used in heat exchange reactors where the reaction mixture is heated or cooled by a heat exchange medium passing around the exterior of the tubes. In particular, such reactors are well known and widely used for the catalytic steam reforming of hydrocarbons wherein a mixture of hydrocarbon, typically methane, and steam are passed at elevated pressure over a particulate reforming catalyst disposed within tubes that are externally heated to high temperatures by a hot gas mixture.

In a heat exchange reactor there can be many hundreds of such tubes, which can be up to 15 meters in length, and effective process control is required to maximise the productivity while at the same time ensuring the apparatus is not over-heated. For example, in heat exchange reformers, control of tube-wall temperatures is vitally important to maximise tube lifetimes. Furthermore catalyst overheating can be undesirable. Process control & monitoring by means of installing temperature measuring devices (e.g. thermocouples) within the catalyst tubes has proven difficult because it has not been possible to ensure that the monitoring device has been placed centrally along the entire length of the tubes.

SUMMARY OF THE INVENTION

We have developed a device to ensure central disposition of a monitoring device in a particulate-filled tube.

Accordingly the invention provides a method for installing a monitoring device with the simultaneous loading of a particulate catalyst into a vertical catalyst tube comprising:
(i) introducing a monitoring device into the tube,
(ii) introducing monitoring device alignment apparatus into the tube,
(iii) introducing catalyst loading apparatus into the tube,
(iv) loading catalyst particles into the top of the tube whereinafter they contact said catalyst loading apparatus as they pass down the tube, forming a uniform bed of catalyst beneath said catalyst loading apparatus and alignment apparatus and around said monitoring device, and
(v) simultaneously removing the catalyst loading apparatus and alignment apparatus from the catalyst tube in timed relationship to the catalyst loading, wherein the monitoring device alignment apparatus comprises a ring member through which the monitoring device may freely pass and two or more spacing members affixed to said ring member that extend from said ring member towards the inside surface of the tube such that the ring member and the monitoring device are centrally positioned within said tube.

The invention also provides a monitoring device alignment apparatus and the combination of monitoring device alignment apparatus and catalyst loading apparatus used in the method. Thus the invention includes an alignment device suitable for installing a monitoring device within a particulate filled tube comprising a ring member through which said monitoring device may freely pass and two or more spacing members attached to the ring member and sized to position the ring and monitoring device centrally within a tube.

Centrally positioning a monitoring device in the tube is desirable as it reduced tube-wall effects. This is especially important where the monitoring device is a temperature sensor.

BRIEF DESCRIPTION OF THE DRAWINGS

The invention is further described by reference to the following drawings in which.

DETAILED DESCRIPTION OF THE INVENTION

Figure 1:
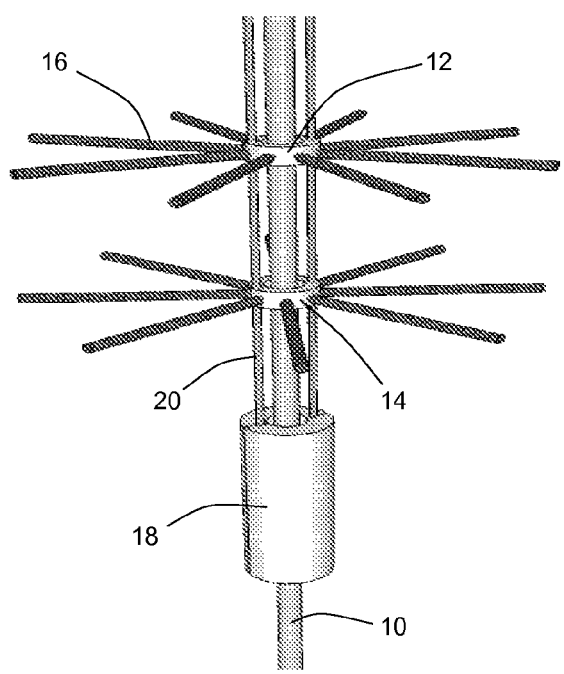
FIG. 1 depicts an oblique view of one embodiment of alignment apparatus comprising two ring members and a weight.

The present invention may be used for loading particulate catalysts and monitoring devices into tubes in any type of reactor, but is especially suited to installing monitoring devices and catalysts into reformer tubes. In reformer apparatus, the catalyst tubes are typically cylinders 10-15 meters in length with an internal diameter of 7.5-15 cm. Perforate catalyst restraining means such as a grid or mesh are typically provided at the bottom of the tube to support the catalyst particles. The top of each tube is connected to a process fluid supply, and typically has a top flange plate that may be removed to allow catalyst loading. The monitoring device may conveniently be installed through this flange plate and connected to conventional data acquisition and storage means.

The catalyst particles may be spheres, cylinders, rings or other catalyst shapes of particle size in the range 10-30 mm formed, for example, by extrusion or pelleting. By 'particle size' we mean the smallest catalyst particle dimension such as length or diameter. The catalyst particles preferably have an aspect ratio <2, more preferably ≤1.5. By "aspect ratio" we mean the length/(diameter or width). Typically in smaller tubes, smaller particles are used, but any combination of particle size may be employed in the present invention as long as the apparatus is sized appropriately for the smallest catalyst particles chosen. We have found the present invention to be especially useful for lobed or fluted cylinders, particularly multi-holed lobed or fluted cylinders having an aspect ratio <2. The lobed or fluted particles have been found to offer considerable improvements in reducing pressure drop whilst maintaining conversion activity, particularly in steam reforming processes. The catalyst is preferably a reforming catalyst. Reforming catalyst particles typically comprise nickel or nickel oxide and/or one or more precious metals on a refractory oxide such as alumina, magnesia or a cement such as calcium aluminate.

The monitoring device may be a device for measuring temperature, pressure or flowrate, or may be a chemical sensor suitable for monitoring the presence of a component on the process fluid flowing over the catalyst particles. Temperature measuring devices or thermocouples are particularly preferred. Such devices often comprise one or more wires, which may be contained within an outer protective sheath, thereby forming a flexible rod. A particularly suitable temperature measuring device is in the form of a rod comprising multiple thermocouple wires separated by an insulator such as MgO all contained within an outer sheath. The number and length of thermocouple wires determines the number of temperature measurement points along the length of the device. Such temperature measuring devices are available commercially and a particularly suitable device, called CatTracker™ is available from Daily Instruments. The thermocouple rod is flexible and so it is difficult to position it accurately within the catalyst-filled tube using conventional catalyst loading techniques.

The first step in the method of the present invention is to insert the monitoring device into the tube. As stated above this may conveniently be performed by feeding it through the top flange plate on the tube. The device is desirably fed down the entire length of the tube so that data may be acquired for the whole tube.

A monitoring device alignment apparatus is then placed in the tube. The monitoring device alignment apparatus comprises a ring member and two or more spacing members extending radially from the ring member that, by contacting the inside wall of the tube, position the ring and therefore the device, which passes through the ring, centrally. The radial thickness of the ring is preferably in the range 0.5-2 cm to reduce the risk of catalyst blockage. The ring member is desirably a ring fabricated from steel, aluminium or plastic that slips over the monitoring device. The internal diameter of the ring is dictated by the thickness of the monitoring device, which may be in the range 5 to 15 mm. The ring member should pass freely over the monitoring device.

In order that the spacing members permit the catalyst particles to pass the alignment apparatus, they are preferably rods, inclined plates or vanes, which may be rigid or flexible. Vanes, flexible rods, e.g. springs, or resilient polymer rods are particularly suitable spacing members. In order that the ring member is centrally positioned within the tube the ring member has 2 or more spacing members, preferably 3-15, more preferably 5-12 spacing members positioned around the outer circumference of the ring member. In a particularly preferred embodiment the alignment device has 5-12 rod or spring spacing members evenly positioned around the circumference of the ring member. The spacing members desirably each extend from the ring member to within 2.5 to 7.5 mm of the inside wall of the tube.

While the alignment apparatus is effective utilizing only one ring member, it is possible to connect two or more ring members together, suitably spaced from each other. The spacing members on each of the ring members may be the same or different. Using two or more ring members may be advantageous where the monitoring device is heavy and difficult to move within the tube and effective positioning of the device would require too many spacing members on only one ring. The spacing of the further ring members from each other may be in the range 2.5-50 cm.

The alignment apparatus may be introduced to the tube by slipping the ring over the end of the monitoring device, however where this is prevented by a flange plate or other equipment we have found it useful to construct the ring member from two or more sectional pieces that may be joined around the monitoring device once it has been placed within the tube. Preferably the ring member is constructed from two pieces, more preferably two halves, i.e. semi-circular pieces, as this simplifies fabrication and joining. The pieces may be joined by bolts or other conventional means.

In use, the alignment apparatus is suspended below catalyst loading apparatus. This may be by means of a wire, cable or rope attached to the alignment apparatus that extends all the way up the tube and is pulled up the tube in timed relationship to the removal of the catalyst loading apparatus as the catalyst is loaded. Alternatively and preferably, the alignment apparatus is connected to and suspended from the catalyst loading apparatus. In this way the spatial relationship between the two may be maintained and the catalyst loading and installation of the monitoring device more easily controlled. Thus preferably, as the catalyst is added, the catalyst loading apparatus and the alignment apparatus connected to it are raised simultaneously.

In order to better ensure the alignment apparatus is positioned correctly we have found it useful to attach a weight below the alignment apparatus. In order that the weight does not displace the monitoring device as the apparatus is raised, the weight desirably is in the form of a ring member, desirably an elongate ring or cylinder through which the monitoring device may freely pass. The weight may be an extension of the alignment apparatus, e.g. an extension of the ring member, but is preferably suspended below the alignment apparatus. The radial thickness of the weight is preferably in the range 0.5-2 cm to minimise the risk of blockage or disturbance of the catalyst as it is withdrawn, and also to reduce the risk of catalyst damage. The weight is conveniently fabricated from steel. As with the ring member, the weight may be slipped over the monitoring device, but is preferably constructed from two or more pieces that may be joined around the monitoring device once the monitoring device has been placed within the tube. To simplify fabrication and joining, the weight may be constructed from two pieces, preferably two halves. The weight pieces may also be joined by bolts or other conventional means. The spacing of the weight from the lowermost ring member may be in the range 2.5-100 cm, preferably 10-50 cm.

It is not necessary that the weight possesses spacing members, but these may be included if desired.

The alignment device may be suspended by two or more wires, (or ropes or cables), which are desirably evenly spaced about the ring member so that it is held level during installation and catalyst loading, i.e. so that the ring member is maintained substantially horizontal during the installation and catalyst loading procedure. Further ring members, and the weight, if used, are also preferably suspended from the ring member by two or more wires, which again are desirably evenly spaced about the ring member. The wires may be rigid or flexible, but are desirably flexible to facilitate transportation and installation into the catalyst tube. Two or three wires (or ropes or cables) are preferred as this reduces the chances of them causing a blockage during catalyst loading.

The spacing from the uppermost ring member to the catalyst loading apparatus during loading is desirably in the range 10-200 cm.

In a particularly preferred embodiment, the alignment apparatus comprises one or two ring members, each with spring or rod spacing members, and a weight suspended below the ring member or members, with each ring member and the weight constructed from two halves that are joined around two suspending wires (or ropes or cables) that are locked in position by the act of joining the two halves. The two wires (or ropes or cables) extending above the uppermost ring member are desirably connected to the catalyst loading apparatus.

Catalyst loading apparatus, suitable for loading catalyst into tubes is known and generally comprises one or more wires (or ropes or cables) on which are supported various damping means that act to reduce the catalyst particles' vertical velocity in order to reduce catalyst breakage. Damping means include deflector plates, which may be supported on a rigid member, for example as described in WO2007/039764; Z-like rods, spiral rods or helical rods, for example as described in WO2007/109442; wire meshes, for example as described in EP-A-1749568; wire loops, for example as described in EP-A-1752210; or brushes comprising multiple radially extending springs, for example as described in U.S. Pat. No. 5,247,970. Any catalyst loading apparatus maybe used in combination with the alignment device, however it is preferable that the catalyst loading apparatus allows the monitoring device to remain in position as the catalyst loading apparatus is withdrawn. Hence the catalyst loading apparatus preferably comprises one or more wires supporting damping means in the form of rods, wires or springs which may be straight or bent in various forms.

In a particularly preferred embodiment, the catalyst loading apparatus comprises a wire supporting spaced damper means in the form of flexible radially extending springs, for example as described in the aforesaid U.S. Pat. No. 5,247,970.

A preferred method includes introducing the catalyst loading apparatus connected to the monitoring device alignment apparatus into the tube, loading the catalyst particles into the top of the tube. The catalyst particles contact the catalyst loading apparatus as they pass down the tube, forming a uniform bed of catalyst beneath the alignment apparatus and around the monitoring device. The catalyst loading apparatus and alignment apparatus are simultaneously removed from the catalyst tube in timed relationship to the catalyst loading. As the alignment apparatus is raised, the ring member and spacers together act to position the monitoring device centrally within the tube. The monitoring device is then held in place by the particulate catalyst. Conventional catalyst loading practices may be used for example as described in the aforesaid WO2007/039764, WO2007/109442, EP-A-1749568, EP-A-1752210 and U.S. Pat. No. 5,247,970.

In addition to the catalyst loading apparatus and monitoring device alignment apparatus, the equipment may further comprise a monitoring system such as an camera with light or detector affixed to the underside of the alignment apparatus and connected to a monitor outside the tube to enable the operator to judge the relative distance of the catalyst surface and the loading apparatus during loading. Controlling this distance is useful in minimising the amount of catalyst breakage.

In FIG. 1, a CatTracker™ thermocouple rod 10 has placed about it two ring members 12, 14, each bearing eight equally spaced spring spacing members 16. Suspended beneath the lower ring 14 is a weight 18. The ring members 14, 16 and weight 18 are connected by two flexible wires 20. The ring members 14, 16 and weight 18 are constructed from two halves that are joined around the two suspending wires 20 that are locked in position by the act of joining the two halves.

Figure 2:
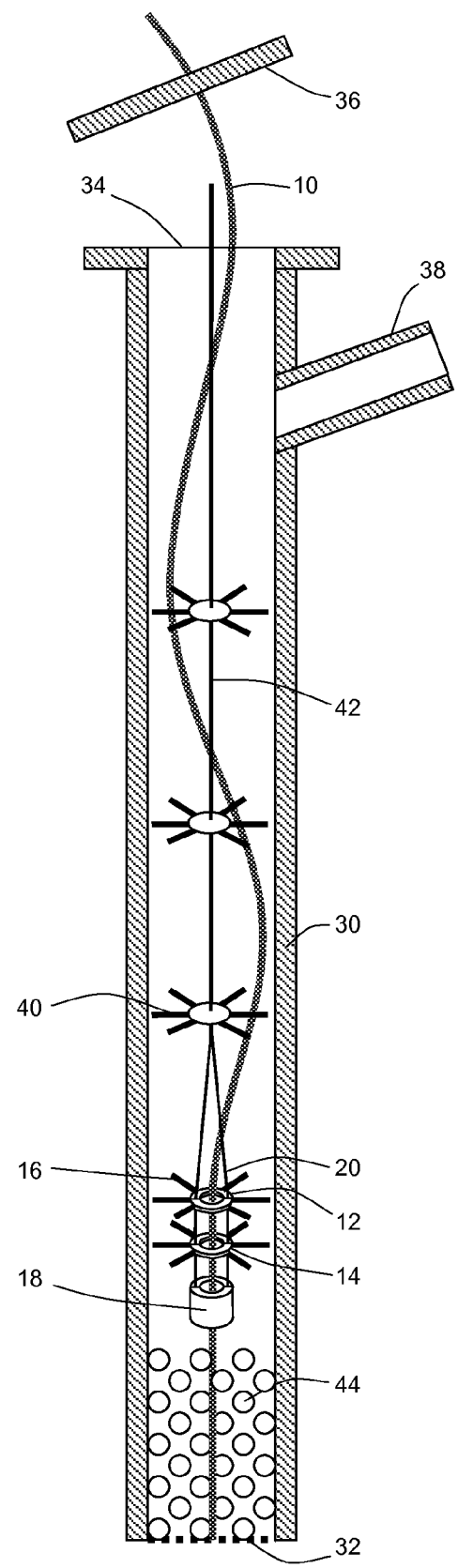
FIG. 2 is a cut-away drawing of a reactor tube containing a monitoring device, alignment apparatus and catalyst loading apparatus in accordance with the present invention.

In FIG. 2, a vertical reformer tube 30 has a lower end with a perforate catalyst support 32 and an upper open end 34 that may be closed with flange plate 36. A process fluid inlet 38 is provided near the top of tube 30. A CatTracker™ thermocouple rod 10 is inserted through an orifice in the flange plate 36 and lowered down the tube 30 to a position adjacent the catalyst support 32. Alignment apparatus comprising ring members 12 and 14 with spacer members 16 and weight 18 are constructed around the thermocouple 10 above the open end 34 with the weight 18 below the ring members 12 and 14. The weight 18 is suspended from the ring members by two wires 20 that extend above the ring member and are used to connect the alignment apparatus to the underside of the catalyst loading apparatus. The catalyst loading apparatus comprises a plurality of dampers 40 connected by wire 42. The dampers comprise a plurality of radially extending springs as described in the aforesaid U.S. Pat. No. 5,247,970. In this figure only three dampers are depicted but it will be understood that there be many more depending upon the length of the tube. The combined alignment means and catalyst loading apparatus is then lowered down the tube to a position adjacent the perforate catalyst support 32. Particulate steam reforming catalyst 44 is then poured down the tube either from open end 34 or process fluid inlet 38. The particles contact the damper means as they descend and then spacer members 16. The dampers 40 and spacer members 16 act to slow the vertical velocity of the catalyst and form a uniform bed beneath the weight 18. The catalyst loading apparatus wire 42 is pulled upwards in a timed relationship to the catalyst loading to maintain approximately an even distance between the weight 18 and the rising catalyst surface. An optical monitoring system (not shown) may be attached to the underside of weight 18 to assist in maintaining this distance. As the alignment apparatus is raised the ring member and spacers together act to position the thermocouple 10 centrally within the tube. The thermocouple is then held in place by the particulate catalyst.

In respect of reforming catalysts, the benefits of the present invention include the ability to much more accurately quantify the performance of reformer catalysts, in particular (a) better prediction of the remaining life of the catalyst, (b) improved monitoring of the effects of feed changes, carbon deposition and potash loss, (c) validation of reformer modelling software and (d) in-situ comparison of catalysts.

The references described herein are hereby incorporated by reference in their entireties for all purposes.

What is claimed:

1. An alignment apparatus suitable for installing a monitoring device within a particulate filled tube, the alignment apparatus comprising, a ring member through which said monitoring device may freely pass, two or more flexible wires, ropes or cables, attached to the ring member, and two or more spacing members selected from plates, rods, and springs radially extending from a perimeter of the ring member and sized to position the ring and monitoring device centrally within a tube, said alignment apparatus further comprising a monitoring device selected from the group consisting of a device for measuring temperature, a device for measuring pressure, a device for measuring flowrate, and a chemical sensor for monitoring the presence of a component in a process fluid.

2. Alignment apparatus according to claim 1 wherein the ring member has 5-12 rod or spring spacing members evenly positioned around the circumference of the ring member.

3. Alignment apparatus according to claim 1 wherein the ring member is constructed from two pieces that are adapted to be joined around the monitoring device.

4. Alignment apparatus according claim 1 comprising two or more ring members on which the spacing members on each of the ring members may be the same or different.

5. Alignment apparatus according to claim 1 further comprising a weight suspended below said ring member.

6. Alignment apparatus according to claim 5 wherein the weight is constructed from two pieces that are adapted to be joined around the monitoring device.

7. Alignment apparatus according to claim 1 comprising one or two ring members, each with spring or rod spacing members, and a weight suspended from the ring member or members, with each ring member and the weight constructed from two halves that are joined around two suspending wires that are locked in position by the act of joining the two halves.

8. Alignment apparatus according to claim 1 in combination with a monitoring device selected from a temperature measuring device or thermocouple.

9. A combination of the alignment apparatus according to claim 1 and catalyst loading apparatus.

10. A combination according to claim 9 wherein the catalyst loading apparatus comprises a wire, rope or cable supporting spaced damper means in the form of flexible radially extending springs.

11. A combination according to claim 9 wherein the alignment apparatus is connected to and suspended from the catalyst loading apparatus.

12. A combination according to claim 11 wherein the alignment apparatus is suspended from the catalyst loading apparatus by two or more wires, which are spaced about the ring member so that it is held level during installation and catalyst loading.

13. A combination according to claim 9 wherein a monitoring system is affixed to the underside of the alignment apparatus and connected to a monitor outside the tube to enable the operator to judge the relative distance of the catalyst surface and the loading apparatus during loading.

* * * * *